United States Patent
Tanikawa et al.

(10) Patent No.: US 10,513,288 B2
(45) Date of Patent: Dec. 24, 2019

(54) ELECTRIC POWER STEERING DEVICE

(71) Applicant: Mitsuba Corporation, Gunma (JP)

(72) Inventors: Hiroaki Tanikawa, Kiryu (JP); Shuichi Matsuhashi, Kiryu (JP); Toru Furusawa, Kiryu (JP); Tamotsu Iwazaki, Kiryu (JP)

(73) Assignee: Mitsuba Corporation, Gunma (JP)

( * ) Notice: Subject to any disclaimer, the term of this patent is extended or adjusted under 35 U.S.C. 154(b) by 26 days.

(21) Appl. No.: 15/754,088

(22) PCT Filed: Sep. 29, 2016

(86) PCT No.: PCT/JP2016/078831
§ 371 (c)(1),
(2) Date: Feb. 21, 2018

(87) PCT Pub. No.: WO2017/057580
PCT Pub. Date: Apr. 6, 2017

(65) Prior Publication Data
US 2018/0244306 A1 Aug. 30, 2018

(30) Foreign Application Priority Data

Sep. 30, 2015 (JP) ................................ 2015-192650
Sep. 30, 2015 (JP) ................................ 2015-192651

(51) Int. Cl.
*B62D 5/04* (2006.01)
*B62D 6/00* (2006.01)

(52) U.S. Cl.
CPC ........... *B62D 5/0463* (2013.01); *B62D 5/046* (2013.01); *B62D 5/0481* (2013.01); *B62D 6/00* (2013.01); *B62D 5/0421* (2013.01)

(58) Field of Classification Search
CPC .... B62D 5/0463; B62D 5/046; B62D 5/0481; B62D 6/00; B62D 5/0421
(Continued)

(56) References Cited

U.S. PATENT DOCUMENTS

2001/0023383 A1* 9/2001 Ishihara ................. B62D 5/046
701/41
2005/0258792 A1* 11/2005 Matsuda ................ B62D 5/008
318/432
(Continued)

FOREIGN PATENT DOCUMENTS

JP 2003200845 A 7/2003
JP 2005256643 A * 9/2005
(Continued)

OTHER PUBLICATIONS

PCT Office, International Search Report issued in PCT/JP2016/078831 dated Dec. 20, 2016, 2 pages.
(Continued)

*Primary Examiner* — Jacob D Knutson
(74) *Attorney, Agent, or Firm* — Wood Herron & Evans LLP

(57) ABSTRACT

An electric power steering device includes an electric motor driven by electric power from a power supply and configured to apply an assisting force to a steering shaft, a booster circuit connected to the power supply and configured to supply a boosting voltage to the electric motor, and a control device configured to manage at least one of a boosting duration time that is a continuous operation time of the booster circuit and a boosting prohibition time that is a continuous stoppage time of the booster circuit on the basis of a boosted electric power value during an operation of the booster circuit.

4 Claims, 5 Drawing Sheets

(58) Field of Classification Search
USPC .................................... 180/443, 444, 446
See application file for complete search history.

(56) References Cited

U.S. PATENT DOCUMENTS

| | | | | |
|---|---|---|---|---|
| 2007/0043490 | A1* | 2/2007 | Yokota | B62D 5/046 701/41 |
| 2011/0057510 | A1* | 3/2011 | Yamashita | B60L 1/003 307/10.1 |
| 2011/0272205 | A1* | 11/2011 | Fujimoto | B62D 5/046 180/446 |
| 2015/0008066 | A1* | 1/2015 | Sugiyama | B62D 5/0481 180/443 |
| 2015/0251690 | A1* | 9/2015 | Yamamoto | B62D 5/0484 318/400.21 |
| 2017/0297612 | A1* | 10/2017 | Uryu | H02P 6/28 |

FOREIGN PATENT DOCUMENTS

| | | | |
|---|---|---|---|
| JP | 2006282141 | A | 10/2006 |
| JP | 2008018761 | A * | 1/2008 |
| JP | 2008265739 | A | 11/2008 |
| JP | 2010254006 | A | 11/2010 |
| JP | 2011162113 | A | 8/2011 |
| JP | 2013159289 | A | 8/2013 |

OTHER PUBLICATIONS

Japanese Patent Office, Notice of Allowance issued in corresponding JP 2015-192650 dated Nov. 6, 2018, 6 pages.
Japanese Patent Office, Notice of Allowance issued in corresponding JP 2015-192651 dated Nov. 6, 2018, 6 pages.

* cited by examiner

ELECTRIC POWER STEERING DEVICE

TECHNICAL FIELD

The present invention relates to an electric power steering device.

Priority is claimed on Japanese Patent Application Nos. 2015-192650 and 2015-192651, filed Sep. 30, 2015, the contents of which are incorporated herein by reference.

TECHNICAL BACKGROUND

In the related art, an electric power steering device configured to detect a steering torque applied to a steering wheel by a driver or the like using a steering torque sensor, and generate a steering assist force according to the detected steering torque using a motor to apply the steering assist force to the steering wheel is known. In recent times, an electric power steering device capable of obtaining a larger steering assist force by boosting a voltage of a battery using a booster circuit and supplying the boosted voltage to a motor driving circuit in order to avoid insufficiency of a steering assist force has been proposed (for example, see Patent Document 1).

In such a device, when boosting is normally performed by a booster circuit in order to increase a voltage of a battery such that a steering assist force is not insufficient, the booster circuit is increased in size. Further, switching loss is normally generated on the basis of a switching operation of a transistor that constitutes the booster circuit. As a result, energy loss in the booster circuit becomes relatively large. Patent Document 1 discloses an electric power steering device configured to boost a voltage of a battery using a booster circuit only when a duty ratio of a pulse width modulation (PWM) signal for turning on/off a switching element of a motor driving circuit exceeds a predetermined threshold (100%).

RELATED ART DOCUMENTS

Patent Document

Patent Document 1
Japanese Patent Application, Publication No. 2003-200845

SUMMARY OF INVENTION

Technical Problem

Here, in the electric power steering device disclosed in Patent Document 1, in the booster circuit, a high voltage generated in a drain of a field effect type transistor (HI-M05312 in FIG. 2 of Patent Document 1) that constitutes the booster circuit is supplied to the motor driving circuit. For this reason, when boosting control of the motor is continued by the booster circuit, there is a possibility that heat generation in the field effect type transistor may increase, which may lead to a functional failure of the booster circuit itself. In addition, after the boosting control of the motor is performed by the booster circuit, boosting control is needed again. In this case, when a time interval until a re-boosting is short, there is a possibility that heat of the field effect type transistor may accumulate rather than being radiated, which may lead to a functional failure in the booster circuit itself.

An object of the present invention is to provide an electric power steering device having high reliability.

Solution to Problem

An aspect of the present invention is an electric power steering device including: an electric motor driven by electric power from a power supply and configured to apply an assisting force to a steering shaft; a booster circuit connected to the power supply and configured to supply a boosting voltage to the electric motor; and a control device configured to manage at least one of a boosting duration time that is a continuous operation time of the booster circuit and a boosting prohibition time that is a continuous stoppage time of the booster circuit on the basis of a boosted electric power value during an operation of the booster circuit.

Another aspect of the present invention is an electric power steering device including: an electric motor driven by electric power from a power supply and configured to apply an assisting force to a steering shaft; a booster circuit connected to the power supply and configured to supply a boosting voltage to the electric motor; and a boosting control unit configured to set a boosting duration time calculated from a boosted electric power value and a boosting possible time of the booster circuit when boosting is possible, and interrupt boosting control by the booster circuit when the boosting duration time from a boosting start time elapses.

In addition, in the above-mentioned electric power steering device according to the aspect of the present invention, the boosting control unit counts the boosting duration time according to an increase or decrease in the boosted electric power value, and sets a time until the counted value has been counted up as the boosting duration time.

An aspect of the present invention is an electric power steering device including: an electric motor driven by electric power from a power supply and configured to apply an assisting force to a steering shaft; a booster circuit connected to the power supply and configured to supply a boosting voltage to the electric motor; and a boosting control unit configured to set a boosting prohibition time calculated from a boosted electric power value and a boosting interval time of the booster circuit when boosting control is prohibited, and allow boosting control by the booster circuit when the boosting prohibition time elapses.

In addition, in the above-mentioned electric power steering device according to the aspect of the present invention, the boosting control unit counts the boosting prohibition time from a point of time when the boosting control immediately before was terminated, and sets a time until the counted value has been counted up as the boosting prohibition time.

Advantageous Effects of Invention

As described above, according to the present invention, as an appropriate boosting duration time is set, it is possible to provide an electric power steering device having high reliability. According to the present invention, as an appropriate boosting prohibition time is set, it is possible to provide an electric power steering device having high reliability.

DESCRIPTION OF EMBODIMENTS

Figure 1:
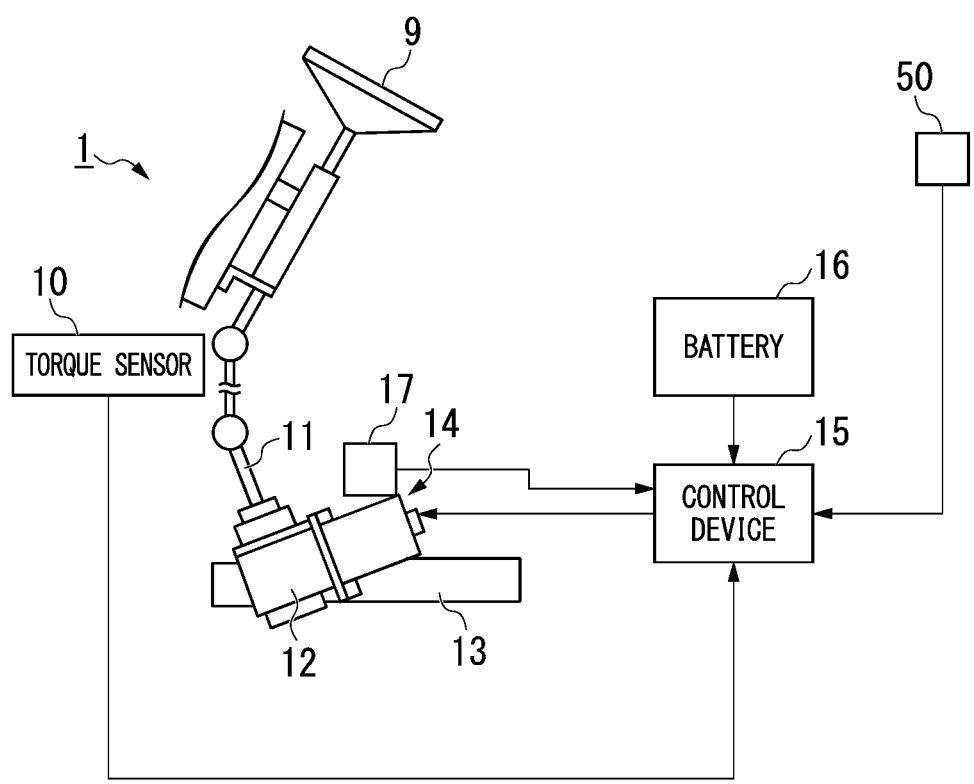
FIG. 1 is a view showing an example of a schematic configuration of an electric power steering device according to an embodiment.

Hereinafter, while the present invention will be described through an embodiment of the present invention, the following embodiment does not restrict the present invention according to the claims. In addition, all combinations of features described in the embodiment are not necessarily essential to the solutions of the present invention. Further, in the drawings, the same or similar parts are designated by the same reference numerals, and repeated description thereof may be omitted. In addition, shapes, sizes, and so on, of elements in the drawings may be exaggerated to more clearly show the embodiment.

An electric power steering device (an electric power steering (EPS) system) according to the embodiment drives an electric motor using electric power supplied from a power supply on the basis of a detected value of a torque sensor configured to detect a steering torque of a steering wheel of a vehicle, and applies a steering assisting force (an assisting force) to the steering shaft using a torque of the electric motor. Further, the electric power steering device according to the embodiment includes a booster circuit configured to boost a voltage of a power supply, and a boosting control unit configured to determine a starting condition for controlling the beginning of boosting of the booster circuit on the basis of an angular acceleration of the electric motor and start boosting of the booster circuit when the determined starting condition is established. Hereinafter, the electric power steering device according to the embodiment will be described with reference to the accompanying drawings.

FIG. 1 is a view showing an example of a schematic configuration of an electric power steering device 1 according to the embodiment. As shown in FIG. 1, the electric power steering device 1 includes a steering wheel 9, a torque sensor 10, a steering shaft 11, a gearbox 12, a steering mechanism 13, an electric motor 14, a control device (a controller) 15, a battery 16, a rotation angle detecting unit 17 and a vehicle speed sensor 50.

The steering wheel 9 is connected to the steering shaft 11. The steering shaft 11 has one end connected to the steering wheel 9 and the other end connected to the gearbox 12. The steering shaft 11 generates a steering torque F applied between the gearbox 12 and the steering shaft 11 when the steering wheel 9 is operated by a driver. The steering shaft 11 rotates according to the steering torque F. The torque sensor 10 is a sensor configured to detect the steering torque F generated in the steering shaft 11 and is constituted by, for example, a torsion bar type twisting force detecting sensor. The torque sensor 10 outputs the detected steering torque F to the control device 15.

The steering mechanism 13 is connected to the gearbox 12. The steering mechanism 13 steers front wheels (not shown) of a vehicle according to an operating force and a steering torque F of the steering wheel for a driver transmitted via the gearbox 12.

The electric motor 14 is connected to the gearbox 12. The electric motor 14 is electrically connected to the control device 15. The electric motor 14 is driven by a driving signal from the control device 15. The electric motor 14 assists a steering force with which the steering mechanism 13 steers the front wheels of the vehicle. That is, rotation of the electric motor 14 is transmitted to the steering shaft 11 via the gearbox 12. Accordingly, an operation of the steering mechanism 13 is assisted, and a driver's labor burden for steering is reduced. Hereinafter, in the embodiment, the case in which the electric motor 14 is a brushless motor of 3 phases (U, V and W) will be described.

The rotation angle detecting unit 17 includes the electric motor 14. The rotation angle detecting unit 17 detects a rotation angle of a rotor of the electric motor 14. For example, the rotation angle detecting unit 17 may be a magnetic rotary encoder including a resolver or a Hall IC. The rotation angle detecting unit 17 outputs an output signal according to the detected rotation angle to the control device 15.

The control device 15 includes a circuit (a processor, a CPU, circuitry), and is electrically connected to the battery 16 (the power supply) mounted on the vehicle. The control device 15 controls driving of the electric motor 14 such that a current flowing through the electric motor 14 reaches a target value. In addition, the control device 15 applies a steering assisting force that assists a steering force of the steering mechanism 13 to the steering shaft 11 by controlling driving of the electric motor 14 on the basis of the steering torque F detected by the torque sensor 10.

The vehicle speed sensor 50 measures a vehicle speed E of the vehicle on which the electric power steering device 1 is mounted. The vehicle speed sensor 50 supplies the measured vehicle speed E to the control device 15.

Figure 2:
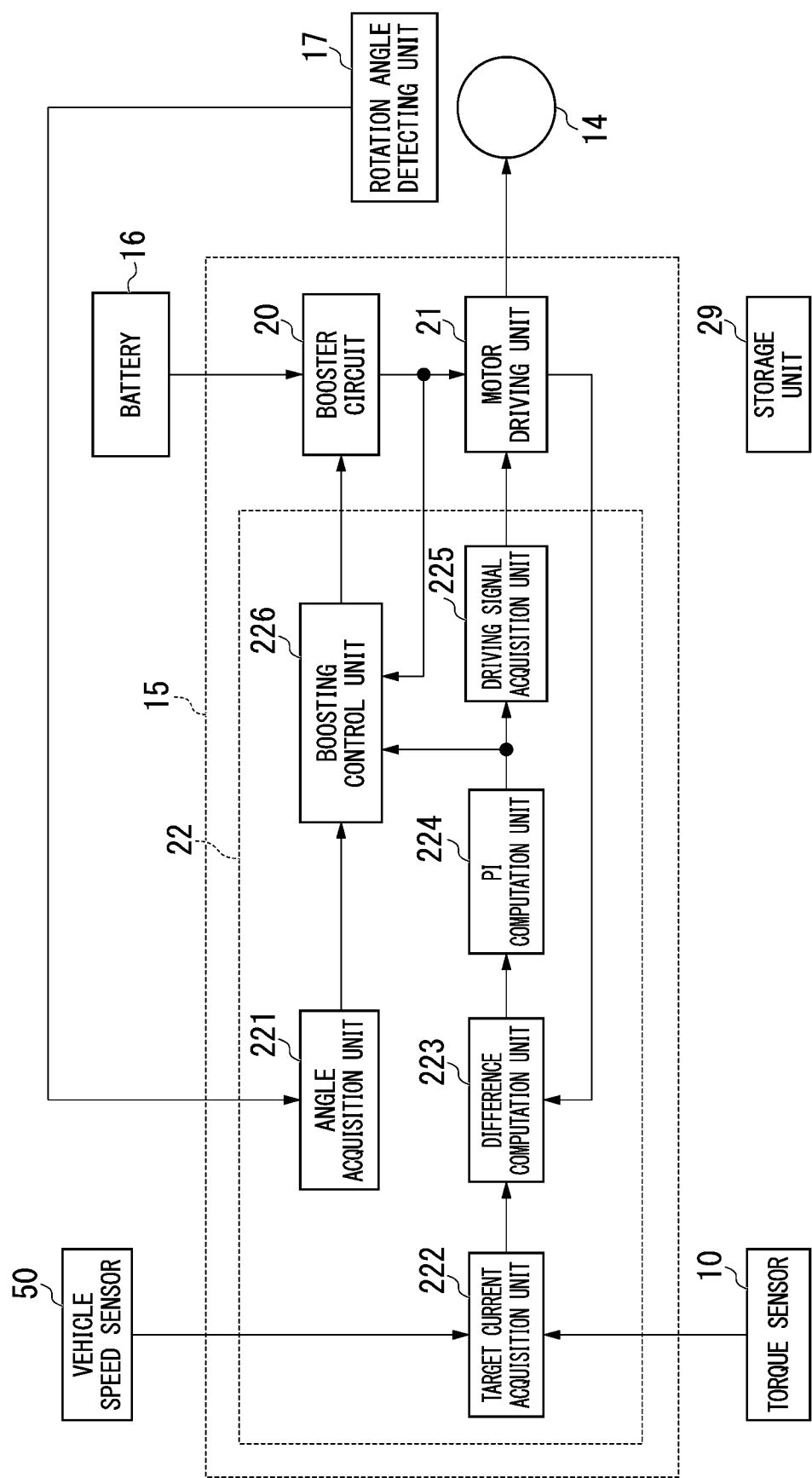
FIG. 2 is a view showing an example of a schematic configuration of a control device according to the embodiment.

FIG. 2 is a view showing an example of a schematic configuration of the control device 15 according to the embodiment. As shown in FIG. 2, the control device 15 includes a booster circuit 20, a motor driving unit 21 and a control unit (a circuit (a processor, a CPU, circuitry)) 22.

The booster circuit 20 is connected to the battery (the power supply) 16 and the motor driving unit 21, and a voltage from the battery 16 (hereinafter, referred to as "a battery voltage") $V_b$ is supplied. The booster circuit 20 boosts the battery voltage $V_b$ on the basis of a booster circuit driving signal supplied from the control unit 22, and supplies the boosted voltage (hereinafter, referred to as "a boosting voltage") $V_s$ to the motor driving unit 21. However, the booster circuit 20 does not boost the battery voltage $V_b$ when the booster circuit driving signal from the control unit 22 is not supplied. Accordingly, the booster circuit 20 supplies the battery voltage $V_b$ to the motor driving unit 21 as it is when the booster circuit driving signal from the control unit 22 is not supplied.

The motor driving unit 21 applies the voltage supplied from the booster circuit 20 to the electric motor 14 on the basis of the driving signal supplied from the control unit 22. For example, the motor driving unit 21 may be an inverter circuit including a plurality of switching elements. The motor driving unit 21 drives the following switching elements through pulse width modulation (PWM) and applies a predetermined driving voltage to the electric motor 14 to drive the electric motor 14 on the basis of the driving signal supplied from the control unit 22.

Figure 3:
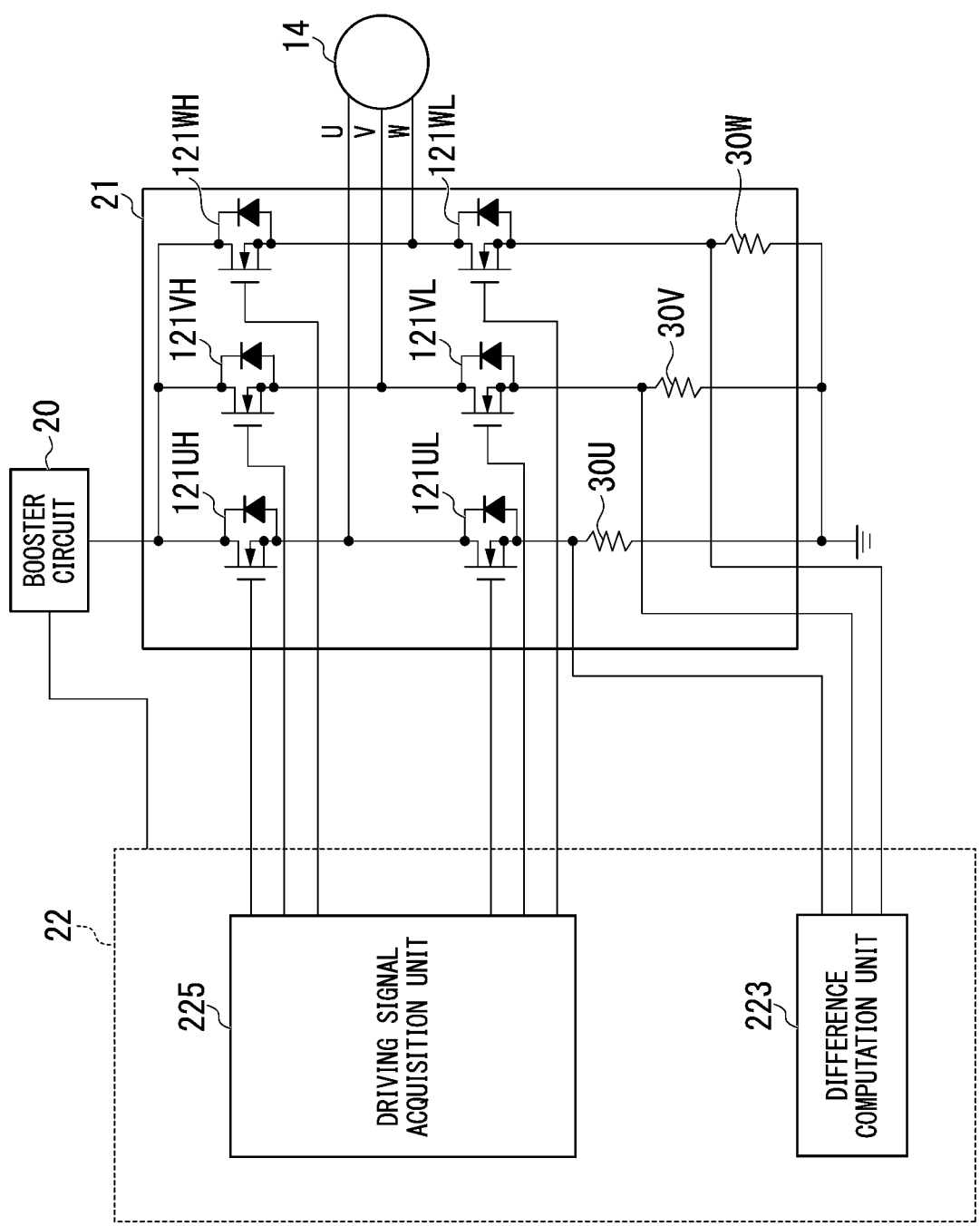
FIG. 3 is a view showing an example of a schematic configuration of a motor driving unit according to the embodiment.

FIG. 3 is a view showing an example of a schematic configuration of the motor driving unit 21 according to the embodiment. As shown in FIG. 3, the motor driving unit 21 converts a direct current voltage supplied from the booster circuit 20 into an alternating current voltage and applies the converted alternating current voltage to the electric motor 14. The direct current voltage supplied from the booster circuit 20 is the battery voltage $V_b$ or the boosting voltage $V_s$.

The motor driving unit 21 includes six switching elements 121UH, 121UL, 121VH, 121VL, 121WH and 121WL. The motor driving unit 21 switches the switching elements 121UH to 121WL ON and OFF according to the driving signal to convert a direct current voltage into an alternating current voltage.

The switching elements 121UH and 121UL that are connected in series, the switching elements 121VH and 121VL that are connected in series, and the switching elements 121WH and 121WL that are connected in series are connected to each other in parallel between the elements and the ground potential via current measurement units 30U, 30V and 30W. In addition, a connecting point of the switching elements 121UH and 121UL is connected to one end of a coil U. A connecting point of the switching elements 121VH and 121VL and a connecting point of the switching elements 121WH and 121WL are connected to one end of a coil V and one end of a coil W, respectively.

Each of the switching elements 121UH to 121WL has a configuration in which, for example, a field effect transistor (FET), an insulated gate bipolar transistor (IGBT), or the like, is connected to a circulation diode in parallel. Further, in the embodiment, the case in which an FET is used will be described, and a parasitic diode in the FET has a function of a circulation diode. In addition, each of the switching elements 121UH to 121WL is switched ON and OFF on the basis of the driving signal input from the driving signal acquisition unit 225 of the control unit 22.

The current measurement units 30U, 30V and 30W are connected to the switching elements 121UH and 121UL, the switching elements 121VH and 121VL and the switching elements 121WH and 121WL between the units and the ground levels thereof in the motor driving unit 21. For example, the current measurement units 30U, 30V and 30W may be constituted by shunt resistors. The current measurement units 30U, 30V and 30W measure a current value flowing through the motor driving unit 21, i.e., a current value $I_m$ input to the electric motor 14. The current measurement units 30U, 30V and 30W output the measured current value $I_m$ to a difference computation unit 223 of the control unit 22. Further, while the case in which the current measurement units 30U, 30V and 30W are shunt resistors has been described in the embodiment, the present invention is not limited thereto.

Returning to FIG. 2, the control unit 22 includes an angle acquisition unit 221, a target current acquisition unit 222, the difference computation unit 223, a PI computation unit 224, a driving signal acquisition unit 225 and a boosting control unit 226.

The angle acquisition unit 221 acquires an angular acceleration A of the electric motor 14 on the basis of the rotation angle supplied from the rotation angle detecting unit 17. For example, the angle acquisition unit 221 may acquire an output signal according to the rotation angle supplied from the rotation angle detecting unit 17. The angle acquisition unit 221 detects a variation amount per unit time of an output signal showing a rotation angle supplied from the rotation angle detecting unit 17, and calculates a rotational speed N of the electric motor 14 (a rotor of the electric motor 14) from the detected variation amount. An angular velocity ω of the electric motor 14 is obtained from the rotational speed N. The angle acquisition unit 221 calculates the angular acceleration A of the electric motor 14 on the basis of the variation amount per unit time of the calculated rotational speed N. The angle acquisition unit 221 supplies the calculated angular acceleration A to the boosting control unit 226.

The target current acquisition unit 222 acquires a target value (hereinafter, referred to as "a target current value") $I_t$ of the motor current flowing through the electric motor 14 on the basis of the vehicle speed E of the vehicle measured by the vehicle speed sensor 50 and the steering torque F supplied from the torque sensor 10. The target current acquisition unit 222 supplies the acquired target current value $I_t$ to the difference computation unit 223. The target current acquisition unit 222 may acquire the target current value $I_t$ on the basis of, for example, a calculation equation or a table, which is previously set. The calculation equation or the table may be determined experimentally or theoretically such that the target current value $I_t$ of the electric motor 14 can be determined on the basis of, for example, the vehicle speed E and the steering torque F. The target current acquisition unit 222 may previously store a look-up table including vehicle speeds, steering torques F, and the target current values $I_t$ of the motor current related whenever the vehicle speed E and the steering torque F are combined in a storage unit (a memory) 29 when a preset table is used. Then, the target current acquisition unit 222 acquires the vehicle speed E supplied from the torque sensor 10 and the target current value $I_t$ corresponding to the steering torque F from the look-up table, and supplies the obtained target current value $I_t$ to the difference computation unit 223.

The difference computation unit 223 acquires the target current value $I_t$ from the target current acquisition unit 222. The difference computation unit 223 acquires the current value $I_m$ measured by the current measurement units 30U, 30V and 30W of the motor driving unit 21. The difference computation unit 223 acquires a difference value ΔI (=the target current value $I_t$–the current value $I_m$) by subtracting the current value $I_m$ obtained from the motor driving unit 21 from the target current value $I_t$ supplied from the target current acquisition unit 222. The difference computation unit 223 supplies the acquired difference value ΔI to the PI computation unit 224.

The PI computation unit 224 performs P (proportional) control processing and I (integral) control processing (hereinafter, referred to as "PI control") with respect to the difference value ΔI supplied from the difference computation unit 223, and computes a command value $V_d$ that brings the difference value ΔI close to a predetermined value, for example, 0. For example, the command value $V_d$ is a voltage value applied to the electric motor 14. The PI computation unit 224 supplies the computed command value $V_d$ to the boosting control unit 226 and the driving signal acquisition unit 225. However, in the embodiment, the control is not limited to PI control, and PID control may be performed, or another feedback control may be performed.

The driving signal acquisition unit 225 converts the command value $V_d$ supplied from the PI computation unit 224 into a driving signal constituted by pulses that drives turning the switching elements of the motor driving unit 21 ON/OFF through pulse width modulation (PWM), i.e., a pulse width modulation signal. The driving signal acquisition unit 225 supplies the converted driving signal to the motor driving unit 21.

The boosting control unit 226 estimates that there is high speed rotation of the electric motor 14 according to an increase of the angular acceleration A of the electric motor 14, and determines a timing when an operation of the booster circuit 20 starts. In addition, the boosting control unit 226 estimates that there is low speed rotation of the electric motor 14 according to a decrease of the angular acceleration A of the electric motor 14, and determines a timing when an operation of the booster circuit 20 stops. That is, the boosting control unit 226 controls driving of the booster circuit 20 on the basis of the angular acceleration A of the electric motor 14. The case in which the electric motor 14 is rotating at a high speed is a case in which the steering wheel 9 is turned by a large amount over a short time by a driver. That is, a case in which the electric motor 14 is rotating at a high speed is a case in which the steering assisting force is immediately required, and for example, a case in which the steering wheel has been abruptly turned by the driver in the vehicle during traveling is estimated. Accordingly, the boosting control unit 226 can immediately apply a steering assisting force to the steering shaft 11 as the boosting of the booster circuit 20 is started instantly when it is estimated that the electric motor 14 is rotating at a high speed on the basis of the angular acceleration A of the electric motor 14. The boosting control unit 226 acquires a value of the boosting voltage $V_s$ supplied from the booster circuit 20 to the motor driving unit 21, and controls the booster circuit 20 such that the acquired boosting voltage $V_s$ becomes a desired voltage.

Hereinafter, processing of the boosting control unit 226 according to the embodiment will be described in detail.

The boosting control unit 226 determines a control condition by which boosting of the booster circuit 20 is controlled on the basis of the angular acceleration A supplied from the angle acquisition unit 221. The control condition includes a first starting condition and a first stoppage condition. The first starting condition is a condition by which a timing when the boosting of the battery voltage $V_b$ is started by the booster circuit 20 is controlled. The first stoppage condition is a condition by which a timing when the boosting of the battery voltage $V_b$ is stopped by the booster circuit 20 is controlled. Accordingly, the first starting condition is a condition used when the boosting of the battery voltage $V_b$ is not performed by the booster circuit 20. Meanwhile, the first stoppage condition is a condition used when the boosting of the battery voltage $V_b$ is performed by the booster circuit 20.

The first starting condition varies according to the angular acceleration A supplied from the angle acquisition unit 221 in real time. For example, a first starting map including angular accelerations of the electric motors 14 and a first starting condition related to each of the angular accelerations may be previously stored in a storage unit 29 (or the storage unit 29 which is outside) in the boosting control unit 226. Then, the boosting control unit 226 determines the first starting condition corresponding to the angular acceleration A supplied from the angle acquisition unit 221 by acquiring the first starting condition from the first starting map. The boosting control unit 226 supplies a booster circuit driving signal to the booster circuit 20 when the command value $V_d$ supplied from the PI computation unit 224 corresponds to the first starting condition. Further, a case in which the command value $V_d$ corresponds to the first starting condition indicates that the first starting condition is satisfied. In addition, the first starting condition is set such that a condition range becomes wider as the angular acceleration A increases. That is, the first starting condition is set such that the command value $V_d$ corresponding to the first starting condition increases as the angular acceleration A increases. Accordingly, since the command value $V_d$ corresponding to the first starting condition increases as the angular acceleration A increases, boosting of the booster circuit 20 is started earlier.

The first stoppage condition varies according to the angular acceleration A supplied from the angle acquisition unit 221 in real time. For example, a first stoppage map including angular accelerations of the electric motors 14 and a first stoppage condition related to each of the angular accelerations is previously stored in the storage unit 29 (or the storage unit 29 which is outside) in the boosting control unit 226. Then, the boosting control unit 226 determines the first stoppage condition corresponding to the angular acceleration A supplied from the angle acquisition unit 221 by acquiring it from the first stoppage map. The boosting control unit 226 stops supply of a booster circuit driving signal to the booster circuit 20 when the command value $V_d$ supplied from the PI computation unit 224 corresponds to the first stoppage condition. Further, the case in which the command value $V_d$ corresponds to the first stoppage condition indicates that the first stoppage condition is satisfied. In addition, the first stoppage condition is set such that a condition range becomes wider as the angular acceleration A decreases. That is, the first stoppage condition is set such that the command value $V_d$ corresponding to the first stoppage condition increases as the angular acceleration A decreases. Accordingly, since the command value $V_d$ corresponding to the first starting condition increases as the angular acceleration A decreases, boosting of the booster circuit 20 is stopped earlier.

As described above, the electric power steering device 1 according to the embodiment determines a first starting condition by which starting of the boosting of the booster circuit 20 is controlled on the basis of the angular acceleration of the electric motor 14, and starts the boosting of the booster circuit 20 when the determined first starting condition is satisfied. Accordingly, since a voltage of the battery can be boosted at a desired timing, a discomforting steering feeling for a driver can be mitigated. That is, boosting control with no delay in assisting the steering force becomes possible.

In addition, the electric power steering device 1 according to the above-mentioned embodiment further determines a first stoppage condition by which boosting of the booster circuit 20 is stopped on the basis of the angular acceleration of the electric motor 14 when the booster circuit 20 boosts the battery voltage $V_b$, and stops the boosting of the booster circuit 20 when the determined first stoppage condition is satisfied. Accordingly, since the boosting of the voltage of the battery can be stopped at a desired timing, a discomforting steering feeling for a driver can be reduced.

Further, in the electric power steering device 1 of the embodiment, as described below, at least one of a boosting duration time (a time limit) that is a continuous operation time of the booster circuit 20 and a boosting prohibition time (a necessary interval) that is a continuous stoppage time of the booster circuit 20 is managed on the basis of the boosted electric power value during an operation of the booster circuit 20.

First, an example of management of the boosting duration time (a time limit of a continuous operation of the booster circuit 20) will be described below. In the electric power steering device 1 of the embodiment, as an appropriate boosting duration time is set, it is possible to provide an electric power steering device having high reliability.

The boosting control unit 226 calculates a boosted electric power value when boosting of the battery voltage $V_b$ by the booster circuit 20 is performed (when the boosting control unit 226 supplies the booster circuit driving signal to the booster circuit 20), and calculates a boosting possible time from a built-in boosting possible time map. The boosting control unit 226 calculates a boosted electric power value by multiplying the boosting voltage $V_s$ by the current value $I_m$ measured by the current measurement units 30U, 30V and 30W. The boosting control unit 226 calculates a boosting possible time corresponding to the boosted electric power value that is calculated.

Figure 4:
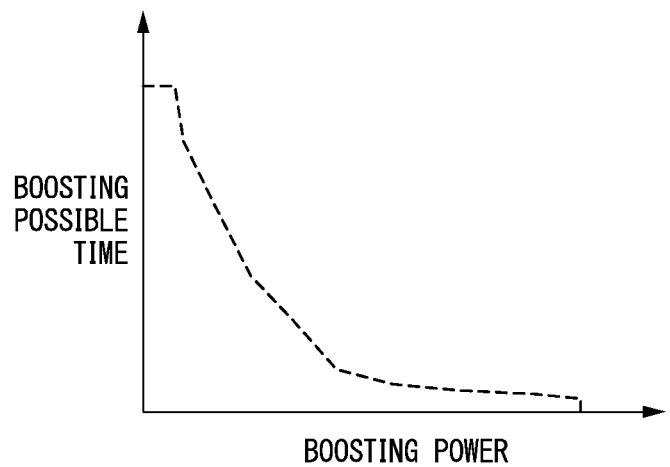
FIG. 4 is a view showing an example of a boosting possible time map.

Here, the boosting possible time is a value obtained on the basis of reliability data previously obtained by experiments or the like on the booster circuit 20. FIG. 4 is a view showing an example of a boosting possible time map. In FIG. 4, a lateral axis shows a boosted electric power value and a vertical axis shows a boosting possible time. As shown in FIG. 4, the boosting possible time tends to decrease as the boosted electric power value increases and tends to increase as the boosted electric power value reduces. The boosting control unit 226 has the storage unit 29 (or the storage unit 29 which is outside) configured to store a boosting possible time map (relation information, relation parameters related to the boosted electric power value and the boosting possible time, which are as shown in FIG. 4. The boosting control unit 226 calculates an appropriate boosting possible time corresponding to the calculated boosted electric power value when boosting is actually possible, with reference to, for example, the boosting possible time map shown in FIG. 4. However, while the boosting possible time map is previously stored in the storage unit 29 in the embodiment, the boosting possible time may be calculated using other relation information (relation parameters) showing a relation between the boosted electric power value and the boosting possible time without using a map.

Figure 5:
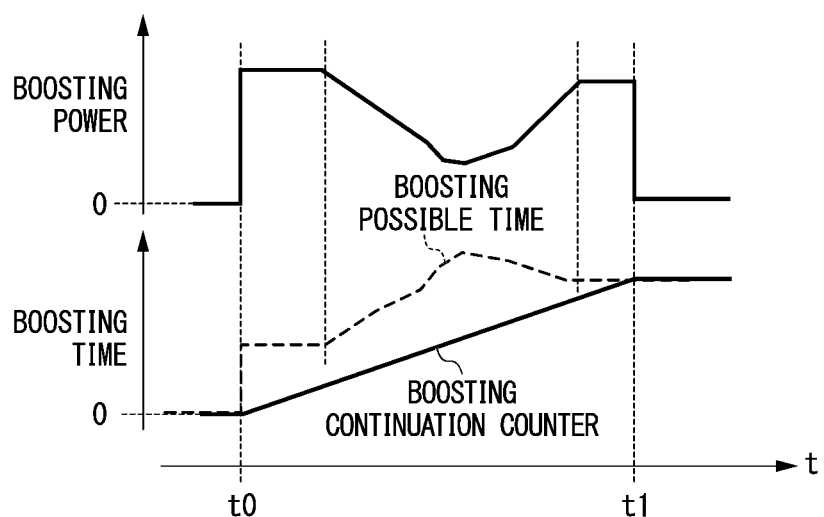
FIG. 5 is a view showing an example of a boosting time chart.

The boosting control unit 226 interrupts supply of the booster circuit driving signal to the booster circuit 20 when the boosting possible time calculated from the boosting start time elapses, and boosting of the battery voltage $V_b$ by the booster circuit 20 is not performed. FIG. 5 is a view showing an example of a boosting time chart. In FIG. 5, a lateral axis shows a time, and a vertical axis shows a boosted electric power value and a boosting time. The boosting time shown by the vertical axis shows a boosting possible time corresponding to the boosted electric power value, and a boosting continuation counter. The boosting control unit 226 counts a boosting duration time (a boosting time from a boosting start time, a continuous operation time of the booster circuit 20) using a built-in counter, and interrupts the boosting of the battery voltage $V_b$ by the booster circuit 20 when the boosting duration time as the counted result exceeds the boosting possible time. As shown in FIG. 5, a time t0 represents a boosting start time, and a time t1 represents a time when boosting of the battery voltage $V_b$ by the booster circuit 20 is interrupted.

In this way, the boosting control unit 226 sets a boosting duration time when boosting is possible in practice using the boosting possible time map related to the boosting voltage value and the boosting possible time of the booster circuit 20, and interrupts the boosting control by the booster circuit 20 when the boosting duration time from the boosting start time elapses. Here, the boosting control unit 226 counts the boosting duration time using the counter according to an increase or decrease in the boosted electric power value in a duration of the time t0 to t1, and sets a time until the counted value has been counted up (exceeds the boosting possible time) as a boosting duration time.

As described above, according to the electric power steering device 1 of the embodiment, as the longest time (the boosting duration time) of the boosting is controlled by the boosting possible time calculated from the boosted electric power value, overheating of the booster circuit 20 can be prevented while securing the boosting state. Accordingly, according to the electric power steering device 1 of the embodiment, as an appropriate boosting duration time is set, it is possible to provide an electric power steering device having high reliability.

Next, an example of management of a boosting prohibition time (a necessary interval of the booster circuit 20) will be described below. In the electric power steering device 1 of the embodiment, as an appropriate boosting prohibition time is set, it is possible to provide an electric power steering device having high reliability.

As described above, according to the electric power steering device 1 of the embodiment, as the longest time (the boosting duration time) of the boosting is restricted by the boosting possible time calculated from the boosted electric power value, overheating of the booster circuit 20 can be prevented while securing a boosting state.

Meanwhile, when a time until re-boosting is short after the boosting control unit 226 interrupts the boosting control by the booster circuit 20, there is a possibility that heat of the field effect type transistor may be accumulated without being radiated, leading to functional failure of the booster circuit itself. Here, the boosting control unit 226 calculates a boosting interval time corresponding to the boosted electric power value that is calculated at a time when the boosting control by the booster circuit 20 is interrupted (a point of time when the boosting control immediately before was terminated).

Figure 6:
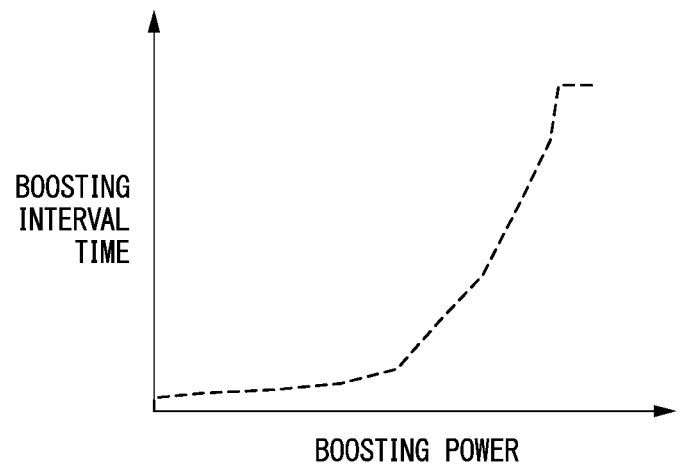
FIG. 6 is a view showing an example of a boosting interval time.

Here, the boosting interval time is a value obtained on the basis of reliability data previously obtained by the booster circuit 20 through experiments or the like. FIG. 6 is a view showing an example of a boosting interval time. In FIG. 6, a lateral axis shows a boosted electric power value and a vertical axis shows a boosting interval time. As shown in FIG. 6, the boosting interval time tends to become longer as the boosted electric power value is increased. The boosting control unit 226 has the storage unit 29 configured to store a boosting interval time map related to a boosted electric power value and a boosting interval time as shown in FIG. 6. The boosting control unit 226 calculates an appropriate boosting interval time corresponding to the boosted electric power value calculated at a time when the boosting control by the booster circuit 20 is interrupted, with reference to, for example, the boosting interval time map shown in FIG. 6. However, in the embodiment, while the boosting interval time map is previously stored in the storage unit 29, a boosting interval time may be calculated using other relation information (relation parameters) showing a relation between the boosted electric power value and the boosting interval time without using a map.

Figure 7:
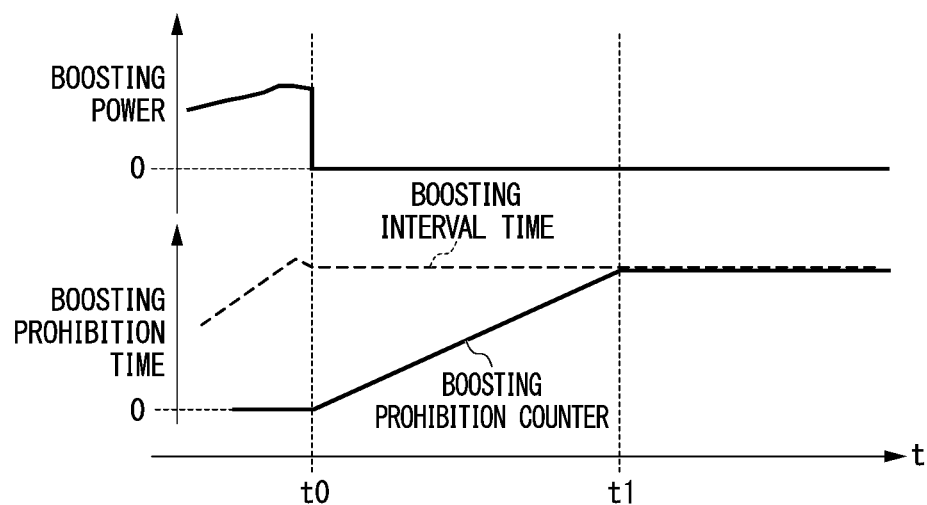
FIG. 7 is a view showing an example of a boosting interval time chart.

The boosting control unit 226 allows supply of the booster circuit driving signal to the booster circuit 20 when a boosting interval time calculated from a time when boosting control by the booster circuit 20 is interrupted has elapsed, and boosting of the battery voltage $V_b$ by the booster circuit 20 is performed. FIG. 7 is a view showing an example of a boosting interval time chart. In FIG. 7, a lateral axis shows a time and a vertical axis shows a boosted electric power value and a boosting time. The boosting time shown by the vertical axis shows a boosting interval time corresponding to a boosted electric power value calculated at a time when boosting control by the booster circuit 20 is interrupted, and a boosting prohibition counter. The boosting control unit 226 counts a boosting prohibition time (a time from a boosting termination time, a continuous stoppage time of the booster circuit 20) using a built-in counter, and allows boosting of the battery voltage $V_b$ by the booster circuit 20 when a boosting prohibition time that is the counted result exceeds a boosting interval time. As shown in FIG. 7, the time t0 represents a boosting termination time, and the time t1 represents a time when boosting of the battery voltage $V_b$ by the booster circuit 20 is allowed.

In this way, the boosting control unit 226 sets a boosting prohibition time when boosting control is prohibited using a boosting interval time map related to the boosted electric power value and the boosting interval time of the booster circuit 20, and allows boosting control by the booster circuit 20 when the boosting prohibition time elapses. Here, the boosting control unit 226 counts a boosting prohibition time from a point of time (t0) when the boosting control immediately before was terminated, and sets a time until the counted value has been counted up (exceeds a boosting interval time) as a boosting prohibition time.

As described above, according to the electric power steering device 1 of the embodiment, as a time (a boosting prohibition time) when boosting is prohibited is set according to the boosting interval time calculated from the boosted electric power value, radiation from the booster circuit can be secured. Accordingly, according to the electric power steering device 1 of the embodiment, as an appropriate boosting prohibition time is set, it is possible to provide an electric power steering device having high reliability.

Parts of the control unit 22 may be realized by hardware or may be realized by a combination of hardware and software. In addition, when a program is executed, a computer may function as a part of the control unit 22. The program may be stored in a computer-readable medium, or may be stored in a storage device connected to a network.

The boosting control unit 226 according to the above-mentioned embodiment may be realized by a computer. In this case, a program configured to perform a function thereof may be recorded on a computer-readable recording medium, and the program recorded on the recording medium may be read and executed by a computer system. Further, "the computer system" disclosed herein includes hardware such as an OS, peripheral devices, or the like. In addition, "the computer-readable recording medium" refers to as a portable storage medium such as a flexible disk, a magneto-optical disk, a ROM, a CD-ROM, or the like, or a storage device such as a hard disk or the like installed in a computer system. Further, "the computer-readable recording medium" may include a medium for dynamically storing a program for a short time, such as a communication channel when a program is transmitted via a network such as the Internet or the like or a communication line such as a telephone line or the like, and a medium for storing a program for a certain time such as a volatile memory in a computer system that is a server or a client in this case. In addition, the program may be configured to realize some of the above-mentioned functions, may be configured to further realize a combination of the above-mentioned functions and a program previously recorded on the computer system, and may be realized using a programmable logic device such as a field programmable gate array (FPGA) or the like.

Hereinabove, while the embodiment of the present invention has been described in detail with reference to the accompanying drawings, the specific configuration is not limited to the embodiment and may include designs or the like without departing from the spirit of the present invention.

EXPLANATION OF NUMERALS AND CHARACTERS

1 Electric power steering device
9 Steering wheel
10 Torque sensor
11 Steering shaft
12 Gearbox
13 Steering mechanism
14 Electric motor
15 Control device
16 Battery
20 Booster circuit
21 Motor driving unit
22 Control unit
29 Storage unit
50 Vehicle speed sensor
221 Angle acquisition unit
222 Target current acquisition unit
223 Difference computation unit
224 PI computation unit
225 Driving signal acquisition unit
226 Boosting control unit

The invention claimed is:

1. An electric power steering device comprising:
an electric motor driven by electric power from a power supply and configured to apply an assisting force to a steering shaft;
a booster circuit connected to the power supply and configured to supply a boosting voltage to the electric motor;
a storage unit, and
a controller configured to:
set a boosting duration time based on a boosting possible time map, which is stored in the storage unit and defines a relationship between a boosted electric power value of the booster circuit and a boosting possible time,
set a boosting prohibition time based on a boosting interval time map, which is stored in the storage unit and defines a relationship between the boosted electric power value and a boosting interval time,
interrupt a boosting control of the booster circuit when the boosting duration time from a boosting start time elapses,
allow the booster control of the booster circuit when the boosting prohibition time elapses,
wherein the boosting possible time map is set such that the boosting possible time decreases as the boosted electric power value increases, and
the boosting interval time map is set such that the boosting interval time increases as the boosted electric power value increases.

2. The electric power steering device according to claim 1, further comprising a current measurement unit configured to acquire a current value of the electric motor,
wherein the controller is configured to calculate the boosted electric power value using the current value from the current measurement unit.

3. The electric power steering device according to claim 1, wherein the controller counts the boosting duration time according to an increase or decrease in the boosted electric power value, and sets a time until the counted value has been counted up as the boosting duration time.

4. The electric power steering device according to claim 1, wherein the controller counts the boosting prohibition time from a point of time when the boosting control immediately before was terminated, and sets a time until the counted value has been counted up as the boosting prohibition time.

* * * * *